US007353102B2

(12) United States Patent
Narita et al.

(10) Patent No.: US 7,353,102 B2
(45) Date of Patent: Apr. 1, 2008

(54) TROUBLE DIAGNOSIS APPARATUS FOR SUPERCHARGER OF INTERNAL COMBUSTION ENGINE

(75) Inventors: Yuji Narita, Kariya (JP); Yoshiyuki Takahashi, Kariya (JP); Takeshi Imai, Kariya (JP); Hisanobu Suzuki, Toyota (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/547,950

(22) PCT Filed: Apr. 28, 2005

(86) PCT No.: PCT/JP2005/008217

§ 371 (c)(1),
(2), (4) Date: Oct. 6, 2006

(87) PCT Pub. No.: WO2005/108756

PCT Pub. Date: Nov. 17, 2005

(65) Prior Publication Data
US 2007/0163258 A1 Jul. 19, 2007

(30) Foreign Application Priority Data
May 6, 2004 (JP) ............................. 2004-137744

(51) Int. Cl.
*F02B 39/16* (2006.01)
*G06F 19/00* (2006.01)
*F02B 37/007* (2006.01)

(52) U.S. Cl. ..................... 701/102; 701/100; 60/612

(58) Field of Classification Search ................ 701/102, 701/101, 100, 108, 109, 115; 60/612, 605.1, 60/605.2; 123/568.2
See application file for complete search history.

(56) References Cited

U.S. PATENT DOCUMENTS 4,805,574 A * 2/1989 Sakamoto et al. ...... 123/406.55
6,694,734 B2 2/2004 Akao et al. ................ 60/605.1

FOREIGN PATENT DOCUMENTS

| JP | 3-222820 A | * 10/1991 |
| JP | 9-508691 | 9/1997 |
| JP | 10-311223 | 11/1998 |
| JP | 11-509908 | 8/1999 |

(Continued)

*Primary Examiner*—Hieu T. Vo
(74) *Attorney, Agent, or Firm*—Morgan & Finnegan, L.L.P.

(57) ABSTRACT

An internal combustion engine includes parallel first and second intake passages, and the intake passages respectively include first and second superchargers. A first airflow meter measures the intake air amount in the first intake passage. A second airflow meter measures the intake air amount in the second intake passage. An ECU obtains an air amount difference between the intake air amount measured by the first airflow meter and the intake air amount measured by the second airflow meter to compare the obtained air amount difference with a predetermined abnormality determination value. The ECU determines that an abnormality has occurred in one of the superchargers when the air amount difference exceeds the abnormality determination value. The abnormality determination of the superchargers is based on the air amount difference between the intake passages. This accurately determines the occurrence of an abnormality in the superchargers regardless of structure of the intake passages.

20 Claims, 2 Drawing Sheets

FOREIGN PATENT DOCUMENTS

| | | |
|---|---|---|
| JP | 2001-107738 | 4/2001 |
| JP | 2002-004872 | 1/2002 |
| JP | 2003-120304 | 4/2003 |
| WO | WO 96/30635 | 10/1996 |
| WO | WO 97/39231 | 10/1997 |

* cited by examiner

TROUBLE DIAGNOSIS APPARATUS FOR SUPERCHARGER OF INTERNAL COMBUSTION ENGINE

FIELD OF THE INVENTION

The present invention relates to a diagnostic apparatus for superchargers provided in each of a pair of intake passages in a V-type, horizontally opposed-type, or inline-type internal combustion engine.

BACKGROUND OF THE INVENTION

A V-type internal combustion engine includes a cylinder block having first and second cylinder banks arranged in a V-shaped manner. The cylinder block has first and second cylinder heads mounted on the first and second cylinder banks, respectively. Air is drawn into the cylinders of the first cylinder bank via a first intake passage and a first intake manifold. Air is also drawn into the cylinders of the second cylinder bank via a second intake passage and a second intake manifold. In such an internal combustion engine, the arrangement of first and second superchargers in the first and second intake passages to improve output is known in the art. Each supercharger uses the pressure of exhaust gas discharged from the internal combustion engine to pressurize the intake air in the associated intake passage. An intercooler is provided in the portion of the intake passage downstream from each supercharger to cool the pressurized intake air. A throttle valve is arranged in the portion of the intake passage downstream from each intercooler.

Patent publication 1 discloses a variable-nozzle turbocharger as an example of the superchargers mentioned above. The variable-nozzle turbocharger includes a turbine rotated by exhaust gas, a compressor rotated together with the turbine to pressurize air in the intake passage, and a nozzle vane for varying the flow velocity of the exhaust gas delivered to the turbine. The open degree of the nozzle vane is changed to vary the flow velocity of the exhaust gas delivered to the turbine and change the rotation speed of the turbine.

The turbine is rotated at a high speed by the high-temperature exhaust gas. Further, the nozzle vane is designed such that its open degree is variable to adjust the rotational speed of the turbine. As a result, a mechanical abnormality may occur in the turbocharger due to severe engine operation from harsh conditions or wear.

Patent publication 2 discloses an apparatus for detecting such a mechanical abnormality in a turbocharger. The apparatus disclosed in this patent publication is employed in an internal combustion engine having a single intake passage. The apparatus includes a supercharged pressure sensor, which measures intake pressure (supercharged pressure) in the intake passage at the downstream side of a compressor, and a determination circuit, which compare the intake pressure measured by the supercharged pressure sensor with a preset target supercharged pressure. The occurrence of a mechanical abnormality in the turbocharger is determined based on the difference between the measured intake pressure and the target supercharged pressure.

Patent publication 3 discloses a diagnostic apparatus for a turbocharger that is also applied to an internal combustion engine having a single intake passage. This diagnostic apparatus determines that an abnormality has occurred in the turbocharger when the intake pressure in the intake passage at the downstream side of the compressor differs from the target intake pressure and the intake air amount differs from the target intake air amount.

As for an internal combustion engine having two intake passages, any abnormality may occur in the turbocharger of one of the intake passages. In such a case, the normal turbocharger in the other intake passage is feedback controlled so as to compensate for the supercharging deficiency caused by the abnormality. When applying the diagnostic apparatus of patent publications 1 and 2 to this type of internal combustion engine, the difference between the measured intake pressure and the target value is small even if an abnormality occurs in one of the turbochargers. Therefore, it would be difficult to determine an abnormality.

Patent publication 4 discloses a diagnostic apparatus applied to an internal combustion engine including two exhaust passages. The exhaust passages each include a turbocharger turbine. The apparatus of patent publication 4 measures the exhaust pressure in each exhaust passage and determines the occurrence of an abnormality in the turbocharger based on a difference between the measured exhaust pressures.

From the disclosure of patent publication 4, if an internal combustion engine includes a compressor of a turbo charger in each of two intake passages, the intake pressure (supercharged pressure) in each of the intake passages at the downstream side of the compressor may be measured to determine the occurrence of an abnormality in the turbo charger based on the difference between the measured intake pressures.

In an internal combustion engine having two exhaust passages that are completely separated from each other, the apparatus of patent publication 4 enables the difference between the exhaust pressures in the exhaust passages to be obtained with high accuracy. In the same manner, in an internal combustion engine having two intake passages which are completely separated from each other, the difference between the intake pressures in the intake passages is obtained with high accuracy. However, there are internal combustion engines having two intake passages which are connected to each other. In such type of internal combustion engine, there would be no significant difference between the intake pressures of the intake passages. Thus, the occurrence of an abnormality in the turbo charger cannot be accurately determined based on the difference between the intake pressures in the intake passages.

The problems described above are not limited to only turbochargers but may also occur in mechanical superchargers designed to supercharge by utilizing the power of an internal combustion engine.

Patent Publication 1: Japanese Laid-Open Patent Publication No. 2001-107738

Patent Publication 2: Japanese Laid-Open Patent Publication No. 2003-120304

Patent Publication 3: Japanese Laid-Open Patent Publication No. 2002-4872

Patent Publication 4: Japanese National Phase Laid-Open Patent Publication No. 11-509908

SUMMARY OF THE INVENTION

It is an object of the present invention to provide an abnormality diagnostic apparatus for a supercharger of an internal combustion engine that improves the accuracy of abnormality diagnosis for the supercharger regardless of the structure of the first and second intake passages.

It is an object of the present invention to provide a diagnostic apparatus for first and second superchargers of an internal combustion engine provided in parallel first and second intake passages, respectively. The diagnostic apparatus includes a first measuring device for measuring intake air amount in the first intake passage at a portion downstream from the first supercharger. A second measuring device measures intake air amount in the second intake passage at a portion downstream from the second supercharger. An air amount difference computer obtains an air amount difference, which is the difference between the intake air amount measured by the first measuring device and the intake air amount measured by the second measuring device. A determination unit compares the obtained air amount difference with a preset abnormality determination value and determines that an abnormality has occurred in either one of the first and second superchargers when the air amount difference exceeds the abnormality determination value.

BRIEF DESCRIPTION OF THE INVENTION

DETAILED DESCRIPTION OF THE PREFERRED EMBODIMENTS

An embodiment of the present invention will be described hereafter with reference to the drawings.

Figure 1:
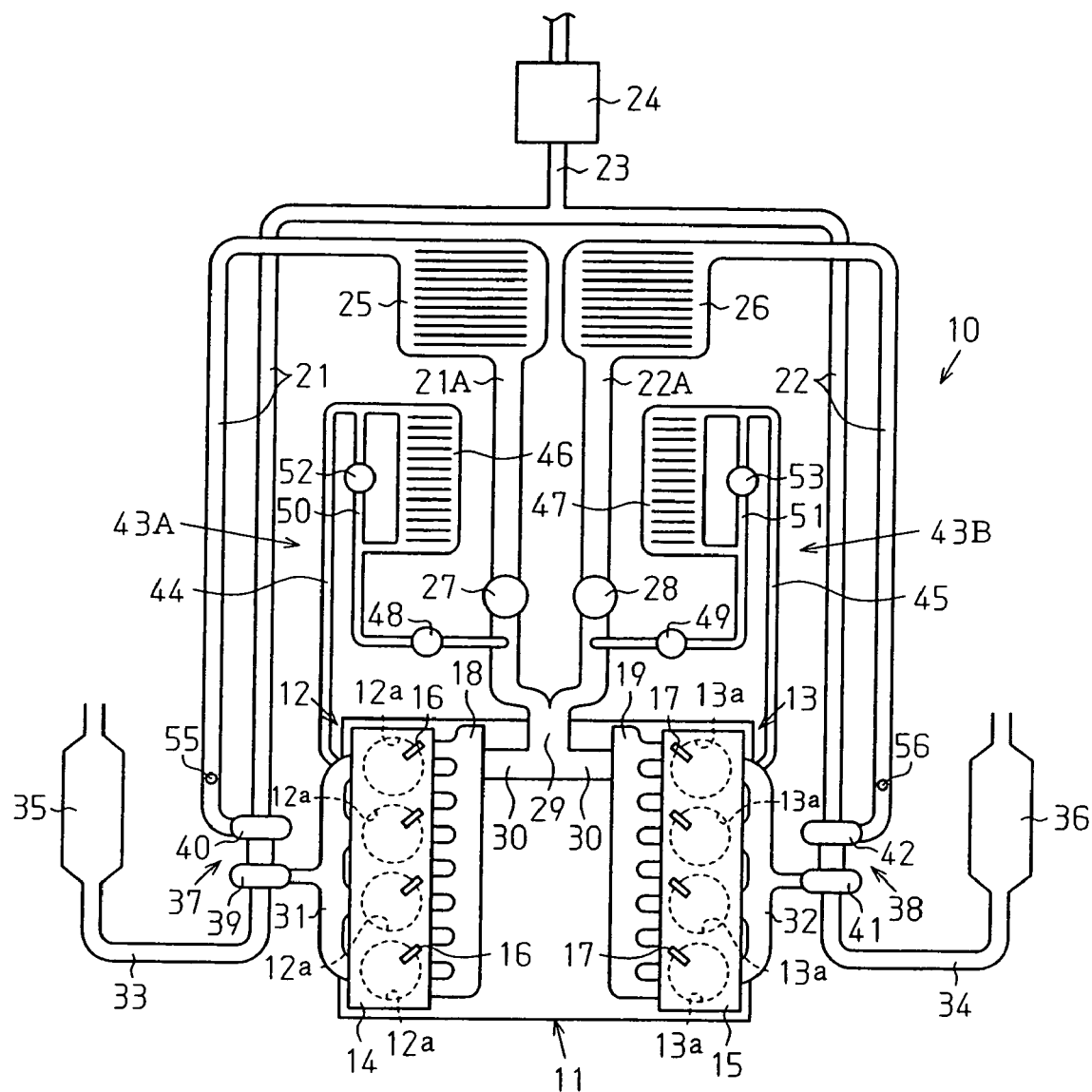
FIG. 1 is a schematic plan view showing a diagnostic apparatus for a supercharger of an internal combustion engine according to an embodiment of the present invention.

As shown in FIG. 1, a cylinder block 11 of an internal combustion engine 10 includes a first cylinder bank 12, which has a plurality of cylinders 12a arranged in a single line, and a second cylinder bank 13, which also has a plurality of cylinders 13a arranged in a single line. The cylinders 12a form a first cylinder row, and the cylinders 13a form a second cylinder row. The first and second cylinder banks 12 and 13 are arranged at a predetermined angle with respect to each other so as to have a V-shape when viewed in the direction in which the cylinders 12a and 13a are arranged. First and second cylinder heads 14 and 15 are mounted on the cylinder block 11 respectively in correspondence with the cylinder banks 12 and 13.

Fuel injection valves 16 are attached to the first cylinder head 14 in correspondence with each cylinder 12a, and fuel injection valves 17 are attached to the second cylinder head 15 in correspondence with each cylinder 13a. A first intake manifold 18 is connected to the first cylinder head 14, and a second intake manifold 19 is connected to the second cylinder head 15. The first and second intake manifolds 18 and 19 are supplied with fresh air through first and second intake passages 21 and 22.

The upstream ends of the first and second intake passages 21 and 22, which are separated from and parallel to each other, are connected to a main intake passage 23, which includes an air cleaner 24. A first intercooler 25, which functions as a cooling device, is arranged in the first intake passage 21, and a second intercooler 26, which also functions as a cooling device, is arranged in the second intake passage 22.

A first throttle valve 27 is arranged in the first intake passage 21 at a position downstream from the first intercooler 25. A second throttle valve 28 is arranged in the second intake passage 22 at a position downstream from the second intercooler 26. The downstream ends of the first and second intake passages 21 and 22 are connected to a merging intake passage 29, and the merging intake passage 29 is connected to the first and second intake manifolds 18 and 19 via a branching passage 30. The branching passage 30 functions as a connection passage for connecting the first and second intake manifolds 18 and 19 to each other.

The first cylinder head 14 is connected to a first exhaust manifold 31, and the second cylinder head 15 is connected to a second exhaust manifold 32. The first exhaust manifold 31 is connected to a first exhaust passage 33, and the second exhaust manifold 32 is connected to a second exhaust passage 34. The first and second exhaust passages 33 and 34 are connected to mufflers 35 and 36, respectively.

A first supercharger 37 includes a turbine 39 arranged in the first exhaust passage 33 and a compressor 40 arranged in the first intake passage 21. The second supercharger 38 includes a turbine 41 arranged in the second exhaust passage 34 and a compressor 42 arranged in the second intake passage 22. The first and second superchargers 37 and 38 are variable-nozzle turbochargers operated by the flow of exhaust gas in the associated exhaust passages 33 and 34. Although not shown in the drawings, the superchargers 37 and 38 each have a nozzle vane for varying the flow velocity of the exhaust gas delivered to the turbines 39 and 41. The flow velocity of the exhaust gas delivered to the turbines 39 and 41 is varied by changing the open degree of the associated nozzle vanes. This changes the rotation speed of the turbines 39 and 41. Refer to, for example, Japanese Laid-Open Patent Publication No. 2001-107738 for the detailed structure of the first and second superchargers 37 and 38.

The compressors 40 and 42 each pressurize the intake air in the associated intake passages 21 and 22 and then send out the air downstream. The intercoolers 25 and 26 located on the downstream side of the compressors 40 and 42 cool the intake air that has been heated by the pressurization to increase the density of the intake air.

First and second exhaust gas recirculation devices (hereafter referred to as EGR devices) 43A and 43B will now be described.

The first EGR device 43A has a first exhaust gas recirculation passage (hereafter referred to as first EGR passage) 44, which extends from the first exhaust manifold 31 to the vicinity of the downstream end of the first intake passage 21 (portion downstream from the throttle valve 27). The second EGR device 43B has a second exhaust gas recirculation passage (hereafter referred to as second EGR passage) 45, which extends from the second exhaust manifold 32 to the vicinity of the downstream end of the second intake passage 22 (portion downstream from the throttle valve 28). EGR coolers 46 and 47 are respectively provided in the EGR passages 44 and 45. Further, EGR valves 48 and 49 are provided in the EGR passages 44 and 45 at the downstream side of the EGR coolers 46 and 47, respectively. The first EGR valve 48 functions as a first flow rate control valve, and the second EGR valve 49 functions as a second flow rate control valve. The EGR coolers 46 and 47 each cool the high-temperature exhaust gas to improve the efficiency for charging intake air into the associated cylinders 12a and 13a.

The first and second EGR passages 44 and 45 are respectively connected to bypass passages 50 and 51 arranged parallel to the EGR coolers 46 and 47. Switch valves 52 and 53 are arranged in the bypass passages 50 and 51, respectively. The switch valves 52 and 53 are controlled to open or close in accordance with the operation state of the internal combustion engine 10. This adjusts the amount of exhaust gas passing through the EGR coolers 46 and 47 which, in turn, adjusts the cooling temperature of the exhaust gas.

A control system of the internal combustion engine 10 will now be described.

A first airflow meter 55, which functions as a first measuring device, is arranged in the first intake passage 21 at the downstream side of the compressor 40. Similarly, a second airflow meter 56, which functions as a second measuring device, is arranged in the second intake passage 22 at the downstream side of the compressor 42. The first and second airflow meters 55 and 56 measure the intake air amount in the associated intake passages 21 and 22 and output signals indicating the measurement result to an electronic control unit (hereafter referred to as "ECU") 57 formed by a computer.

Figure 2:
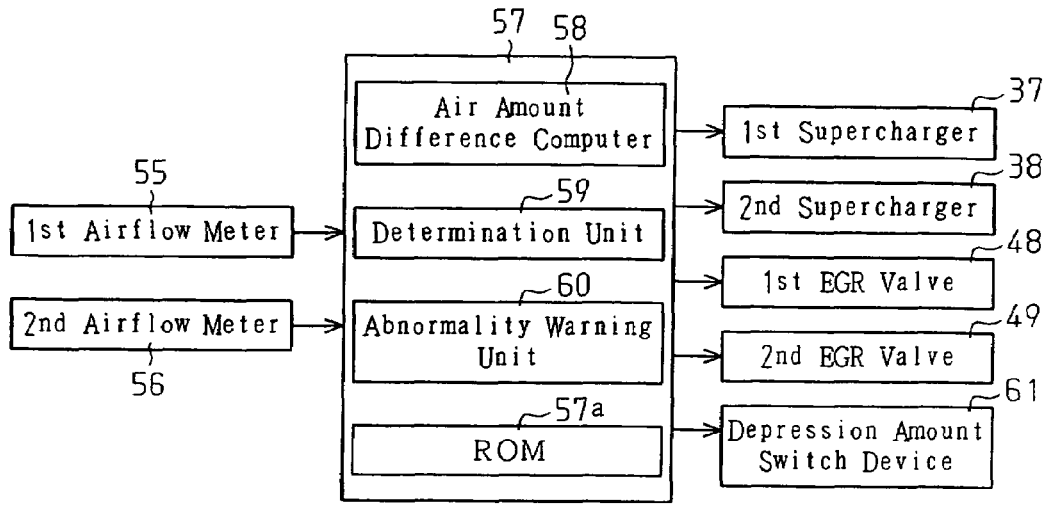
FIG. 2 is a block diagram showing a control system of the internal combustion engine shown in FIG. 1.

In addition to the airflow meters 55 and 56, the ECU 57 shown in FIG. 2 is connected to various types of sensors (not shown) for detecting the operation state of the internal combustion engine 10 and the traveling state of the vehicle. These sensors include, for example, a pedal depression amount sensor detecting the depression amount of the accelerator pedal, an engine speed sensor detecting the speed of the internal combustion engine 10, a coolant temperature sensor detecting the temperature of coolant that cools the internal combustion engine 10, an intake air temperature sensor, throttle sensors detecting the open degree of the first and second throttle valves 27 and 28, and a vehicle speed sensor.

As shown in FIG. 2, the ECU 57 includes an air amount difference computer 58, a determination unit 59, and an abnormality warning unit 60. In other words, the ECU 57 functions as the air amount difference computer 58, the determination unit 59, and the abnormality warning unit 60.

The air amount difference computer 58 obtains the air amount difference, which is an absolute value, between a first intake air amount measured by the first airflow meter 55 and a second intake air amount measured by the second airflow meter 56. The determination unit 59 compares the air amount difference obtained by the air amount difference computer 58 with a predetermined abnormality determination value and determines whether or not the air amount difference has exceeded the abnormality determination value. The abnormality determination value is a threshold value used as reference for determining abnormality in the superchargers 37 and 38 and is preset in a recording medium such as a read-only memory (ROM) 57a arranged in the ECU 57. The abnormality warning unit 60 warns of an abnormality in the first supercharger 37 or second supercharger 38 based on the determination result of the determination unit 59.

The ECU 57 is connected to the superchargers 37 and 38 and the EGR valves 48 and 49 via drive circuits, which are not shown. The ECU 57 is also connected to a depression amount switching device 61 via a drive circuit, which is not shown. The depression amount switching device 61 functions as a depression amount switching means or an engine output suppressing means. More specifically, when it is diagnosed that an abnormality has occurred in one of the first and second superchargers 37 and 38, the depression amount switching device 61 switches the accelerator pedal depression amount to a small depression amount for abnormalities in order to suppress the output of the engine 10. It should be noted that the phrase "switches the accelerator pedal depression amount to a small depression amount for abnormalities" refers to the limitation of the pedal depression amount, which is one of the parameters controlling the output of the engine 10, to a small value for abnormalities even if the actual depression amount of the accelerator pedal is large. This may be realized by a mechanical means or an electrical means. Alternatively, the ECU 57 may suppress the engine output when detecting an abnormality in one of the superchargers 37 and 38 by limiting the fuel injection amount regardless of the actual depression amount of the accelerator pedal. In this case, the ECU 57 functions as an engine output suppression unit.

The ECU 57 computes the appropriate open degree for the nozzle vanes in the first and second superchargers 37 and 38 from the intake air amounts of the first and second intake passages 21 and 22, which are obtained through signals from the first and second airflow meters 55 and 56, and from the operation state of the internal combustion engine and the traveling state of the vehicle, which are obtained through signals from other sensors. The ECU 57 controls the nozzle vane open degree so as to realize the computed open degree. As a result, the rotation speeds of the turbines 39 and 41 and the rotation speeds of the compressors 40 and 42 rotated by the turbines 39 and 41 are adjusted to an appropriate level so that the optimum supercharged pressure is always obtained. This increases the engine torque and improves the standing start acceleration performance of the vehicle.

The ECU 57 also computes an exhaust gas recirculation rate (EGR rate) suitable for the current operation state of the internal combustion engine 10 based on signals from the various types of sensors detecting the engine operating and the traveling state of the vehicle. The EGR rate is the ratio of the amount of recirculated exhaust gas relative to the total amount of gas drawn into the cylinders 12a and 13a. The ECU 57 computes a target open degree for the first and second EGR valves 48 and 49 based on the EGR rate and controls the open degree of the EGR valves 48 and 49 so as to realize the target opening. This recirculates the exhaust gas in a manner suitable for the current engine operation state. For example, when the internal combustion engine 10 is shifted to an idle operation state, the ECU 57 controls the first and second EGR valves 48 and 49 to be substantially completely open. As a result, the EGR rate becomes greater than that when the engine 10 is operating under high load, and a relatively large amount of exhaust gas is recirculated. This suppresses increase in the combustion temperature of the engine 10 and suppresses the discharge of NOx.

Figure 3:
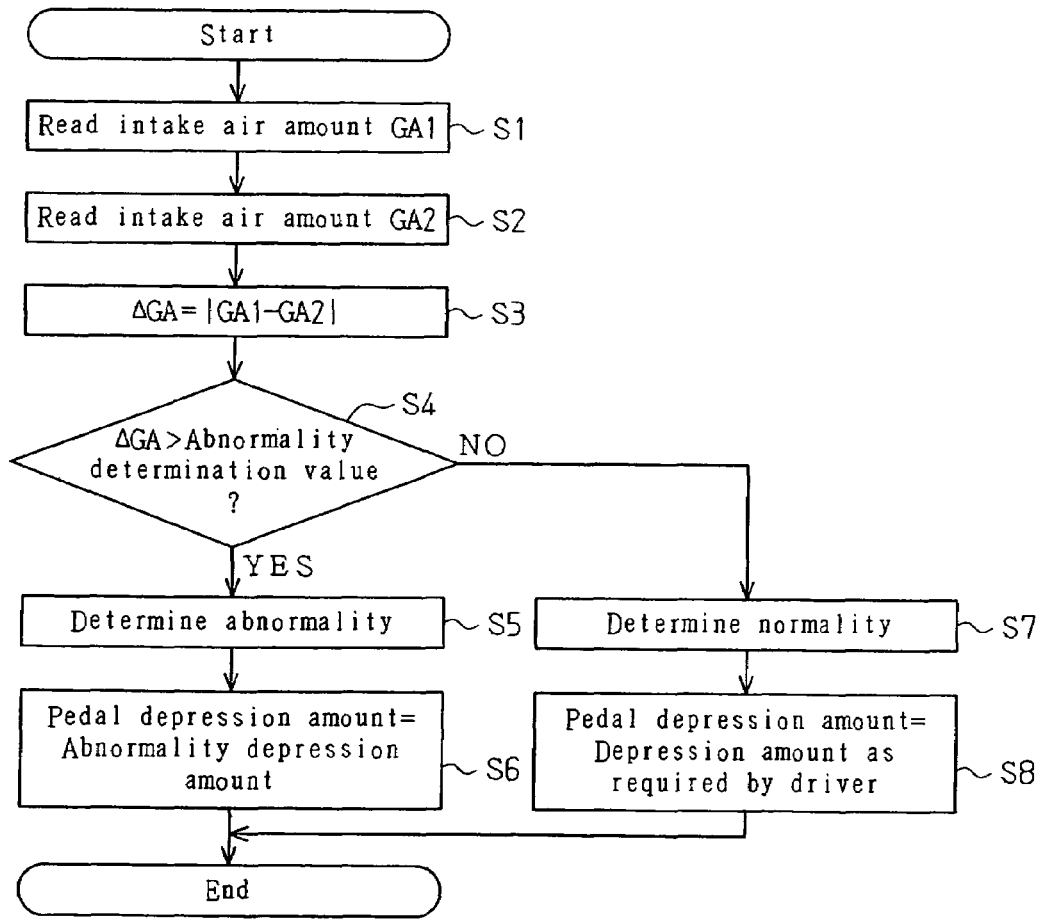
FIG. 3 is a flowchart showing the abnormality diagnosis procedures.

The diagnosis procedures for the first and second superchargers 37 and 38 will now be described with reference to the flowchart of FIG. 3. The procedures shown in this flowchart is performed when the engine 10 is operating.

In step S1, the ECU 57 reads the measurement value of the first airflow meter 55, or the intake air amount (first intake air amount) GA1 at the portion of the first intake passage 21 downstream from the compressor 40. In step S2, the ECU 57 reads the measurement value of the second airflow meter 56, or the intake air amount (second intake air amount) GA2 at the portion of the second intake passage 22 downstream from the compressor 42. In step S3, the air amount difference computer 58 of the ECU 57 computes the air amount difference $\Delta GA$, which is an absolute value, between the first intake air amount GA1 and the second intake air amount GA2.

In step S4, the determination unit 59 of the ECU 57 compares the air amount difference $\Delta GA$ with a preset abnormality determination value. If the air amount difference $\Delta GA$ is greater than the abnormality determination value, in step S5, the determination unit 59 determines that an abnormality has occurred in one of the superchargers 37 and 38. The abnormality warning unit 60 of the ECU 57 then sends an abnormality determination signal to the depression amount switching device 61. In step S6, the depression amount switching device 61 switches the accelerator pedal depression amount to the small depression amount for abnormalities. As a result, the output of the engine 10 is suppressed to prevent the acceleration of the vehicle even if the driver depresses the accelerator pedal.

If it is determined in step S4 that the air amount difference ΔGA is equal to or less than the abnormality determination value, in step S7, the determination unit 59 determines that the superchargers 37 and 38 are operating normally. In this case, the abnormality warning unit 60 does not send the abnormality determination signal to the depression amount switching device 61. Thus, in step S8, the depression amount of the accelerator pedal is set to correspond with the depression amount as required by the driver.

The present embodiment has advantages as described below.

(1) In the present embodiment, the difference between the intake air amount measured by the first airflow meter 55 and the intake air amount measured by the second airflow meter 56 is obtained. When the air amount difference exceeds a preset abnormality determination value, it is determined that an abnormality has occurred in either one of the first and second superchargers 37 and 38. In the internal combustion engine 10 that has the two intake passages 21 and 22, the intake air amounts in the intake passages 21 and 22 are subtly affected by the structures of the intake passages 21 and 22. Therefore, regardless of the structure of the two intake passages 21 and 22 having the superchargers 37 and 38, an abnormality in the superchargers 37 and 38 is detected with high accuracy.

(2) In the present embodiment, the downstream ends of the first and second intake passages 21 and 22 are connected to the merging intake passage 29, and the downstream end of the merging intake passage 29 is connected to the first and second intake manifolds 18 and 19 by the branching passage 30. This structure connects the first and second intake manifolds 18 and 19 with each other and the intake air pressures in the first and second intake passages 21 and 22 thus become uniform. Comparatively, the intake air amounts in the intake passages 21 and 22, which are separated from each other on the upstream side of the merging intake passage 29, do not affect each other. Thus, in the present embodiment that determines abnormalities of the superchargers 37 and 38 based on the air amount difference and not the pressure difference in the intake passages 21 and 22, an abnormality in the superchargers 37 and 38 is determined with high accuracy even when the intake passages 21 and 22 are connected to each other.

(3) In the present embodiment, when an abnormality is detected in either one of the first and second superchargers 37 and 38, the depression amount switching device 61 switches the accelerator pedal depression amount to a depression amount for abnormalities so as to suppress the output of the internal combustion engine 10. This prevents the internal combustion engine 10 from continuing to operate under a severe condition when there is an abnormality in one of the superchargers 37 and 38. This prevents the intake passages 21 and 22 and the exhaust passages 33 and 34 from being damaged due to an abnormality in the supercharger 37 or 38.

The above embodiment above may be modified as described below.

The superchargers 37 and 38, which are turbochargers, may be replaced by mechanical superchargers, which use the power of the internal combustion engine 10 to perform supercharging.

The superchargers 37 and 38 may be turbochargers of a type other than the variable-nozzle type.

One of the first and second EGR passages 44 and 45 may be omitted.

The first and second intake manifolds 18 and 19 may be formed integrally with each other as a single intake manifold.

In addition to the branching passage 30, a further connection passage may be provided to connect the first and second intake manifolds 18 and 19.

The present invention is applicable not only to a V-type internal combustion engine 10 but also to a horizontally opposed-type or inline-type internal combustion engine as long as the internal combustion engine has two intake passages, with a supercharger provided for each passage.

The invention claimed is:

1. A diagnostic apparatus for first and second superchargers of an internal combustion engine provided in parallel first and second intake passages, respectively, the diagnostic apparatus comprising:
   a first measuring device for measuring intake air amount in the first intake passage at a portion downstream from the first supercharger;
   a second measuring device for measuring intake air amount in the second intake passage at a portion downstream from the second supercharger;
   an air amount difference computer for obtaining an air amount difference, which is the difference between the intake air amount measured by the first measuring device and the intake air amount measured by the second measuring device; and
   a determination unit for comparing the obtained air amount difference with a preset abnormality determination value and determining that an abnormality has occurred in either one of the first and second superchargers when the air amount difference exceeds the abnormality determination value.

2. The diagnostic apparatus according to claim 1, wherein the first and second intake passages are connected to each other at downstream sides of the first and second superchargers.

3. The diagnostic apparatus according to claim 2, wherein the internal combustion engine includes first and second cylinder rows, first and second intake manifolds corresponding to the first and second cylinder rows, and a connection passage connecting the two intake manifolds with each other, wherein the first and second intake passages are connected to the connection passage.

4. The diagnostic apparatus according to claim 1, wherein the first and second measuring devices are airflow meters arranged in the associated intake passages downstream from the corresponding superchargers.

5. The diagnostic apparatus according to claim 1, wherein the internal combustion engine includes a first exhaust passage corresponding to the first intake passage and a second exhaust passage corresponding to the second intake passage, wherein each of the superchargers is a turbocharger including a turbine, which is arranged in the corresponding exhaust passage, and a compressor, which is arranged in the corresponding intake passage.

6. The diagnostic apparatus according to claim 1, further comprising:

an engine output suppression unit for suppressing output of the internal combustion engine when the air amount difference exceeds the abnormality determination value.

7. The diagnostic apparatus according to claim 1, wherein the internal combustion engine is mounted on a vehicle including an accelerator pedal, the diagnostic apparatus further comprising:
a switching means for switching depression amount of the accelerator pedal to a depression amount for abnormalities when the air amount difference exceeds the abnormality determination value.

8. The diagnostic apparatus according to claim 1, wherein each of the two intake passages includes a cooling device for cooling the intake air pressurized by the corresponding supercharger.

9. The diagnostic apparatus according to claim 1, wherein the internal combustion engine further includes first and second exhaust gas recirculation devices for recirculating some of the exhaust gas discharged from the engine to the corresponding one of the intake passages.

10. The diagnostic apparatus according to claim 9, wherein each of the exhaust gas recirculation devices includes an exhaust gas recirculation passage connecting an exhaust side of the internal combustion engine to the corresponding intake passage, a flow rate control valve arranged in the exhaust gas recirculation passage, and an EGR cooler arranged in the exhaust gas recirculation passage.

11. The diagnostic apparatus according to claim 10, wherein each of the exhaust gas recirculation passages is connected to a bypass passage arranged parallel to the EGR cooler, wherein the bypass passage includes a switch valve.

12. A diagnostic apparatus for first and second superchargers of an internal combustion engine provided in first and second intake passages extending from first and second cylinder banks, respectively, the diagnostic apparatus comprising:
a first measuring device, arranged in the first intake passage at a portion downstream from the first supercharger, for measuring intake air amount of said portion;
a second measuring device, arranged in the second intake passage at a portion downstream from the second supercharger, for measuring intake air amount of said portion;
an air amount difference computer for obtaining an air amount difference, which is the difference between the intake air amount measured by the first measuring device and the intake air amount measured by the second measuring device;
a determination unit for determining whether or not the obtained air amount difference has exceeded an abnormality determination value prerecorded on a recording medium as a reference value for determining abnormality in the superchargers;
an abnormality warning unit for warning that an abnormality has occurred in one of the first and second superchargers when the air amount difference exceeds the abnormality determination value; and
a controller for controlling the air amount difference computer, the determination unit, and the abnormality warning unit.

13. The diagnostic apparatus according to claim 12, wherein the first and second intake passages are connected to each other at downstream sides of the first and second superchargers.

14. The diagnostic apparatus according to claim 13, wherein the internal combustion engine includes first and second cylinder rows, first and second intake manifolds corresponding to the first and second cylinder rows, and a connection passage connecting the two intake manifolds with each other, wherein the first and second intake passages are connected to the connection passage.

15. The diagnostic apparatus according to claim 12, wherein the first and second measuring devices are airflow meters arranged in the associated intake passages downstream from the corresponding superchargers.

16. The diagnostic apparatus according to claim 12, wherein the internal combustion engine includes a first exhaust passage corresponding to the first intake passage and a second exhaust passage corresponding to the second intake passage, wherein each of the superchargers is a turbochargers including a turbine, which is arranged in the corresponding exhaust passage, and a compressor, which is arranged in the corresponding intake passage.

17. The diagnostic apparatus according to claim 12, further comprising:
an engine output suppression unit for suppressing output of the internal combustion engine when the air amount difference exceeds the abnormality determination value.

18. The diagnostic apparatus according to claim 12, wherein the internal combustion engine is mounted on a vehicle including an accelerator pedal, the diagnostic apparatus further comprising:
a switching means for switching depression amount of the accelerator pedal to a depression amount for abnormalities when the air amount difference exceeds the abnormality determination value.

19. The diagnostic apparatus according to claim 12, wherein each of the two intake passages includes a cooling device for cooling the intake air pressurized by the corresponding supercharger.

20. The diagnostic apparatus according to claim 12, wherein the internal combustion engine further includes first and second exhaust gas recirculation devices for recirculating some of the exhaust gas discharged from the engine to the corresponding one of the intake passages.

* * * * *

UNITED STATES PATENT AND TRADEMARK OFFICE
CERTIFICATE OF CORRECTION

PATENT NO.        : 7,353,102 B2                                    Page 1 of 1
APPLICATION NO.   : 11/547950
DATED             : April 1, 2008
INVENTOR(S)       : Yuji Narita et al.

It is certified that error appears in the above-identified patent and that said Letters Patent is hereby corrected as shown below:

Column 1, line 57, please delete "determination circuit, which compare" and insert therefore -- determination circuit, which compares --;

Column 2, lines 24, 28-29 and 44, please delete "turbo charger" and insert therefore -- turbocharger --; and Column 6, line 50, please delete "flowchart is performed" and insert therefore -- flowchart are performed --.

In Claim 5, column 8, line 62-63, please delete "wherein each of the superchargers is a turbochargers" and insert therefore -- wherein each of the superchargers is a turbocharger --; and In Claim 16, column 10, line 27-28, please delete "wherein each of the superchargers is a turbochargers" and insert therefore -- wherein each of the superchargers is a turbocharger --.

Signed and Sealed this

Eighteenth Day of August, 2009

David J. Kappos
*Director of the United States Patent and Trademark Office*